United States Patent
Bianchini et al.

(10) Patent No.: US 11,449,513 B2
(45) Date of Patent: Sep. 20, 2022

(54) DATA ANALYSIS SYSTEM

(71) Applicant: ADP, Inc., Roseland, NJ (US)

(72) Inventors: Leandro da Silva Bianchini, Porto Alegre (BR); Renata Vieira Palazzo, Porto Alegre (BR); Marcos Pont Ferreira, Porto Alegre (BR); Diego Tremper, Porto Alegre (BR); Luciana Cattony Silva Araujo, Porto Alegre (BR)

(73) Assignee: ADP, Inc., Roseland, NJ (US)

( * ) Notice: Subject to any disclaimer, the term of this patent is extended or adjusted under 35 U.S.C. 154(b) by 476 days.

(21) Appl. No.: 15/059,743

(22) Filed: Mar. 3, 2016

(65) Prior Publication Data
US 2017/0255344 A1    Sep. 7, 2017

(51) Int. Cl.
*G06F 16/24*     (2019.01)
*G06F 16/2457*   (2019.01)
*G06F 16/248*    (2019.01)

(52) U.S. Cl.
CPC ...... *G06F 16/24575* (2019.01); *G06F 16/248* (2019.01)

(58) Field of Classification Search
CPC combination set(s) only.
See application file for complete search history.

(56) References Cited

U.S. PATENT DOCUMENTS

| | | |
|---|---|---|
| 7,231,384 B2 | 6/2007 | Wu et al. |
| 7,404,151 B2 | 7/2008 | Borchardt et al. |
| 8,185,824 B1 * | 5/2012 | Mitchell ............... G06F 3/0481 715/734 |
| 8,347,227 B2 | 1/2013 | Urbalejo et al. |
| 8,407,617 B2 | 3/2013 | Burrier et al. |
| 2006/0218478 A1 * | 9/2006 | Nonclercq ............ G06T 11/206 715/206 |

(Continued)

OTHER PUBLICATIONS

"Features—XMind: The Most Professional Mind Mapping Software," XMind Ltd., copyright 2006-2014, 11 pages. http://www.xmind.net/features/.

(Continued)

*Primary Examiner* — Hope C Sheffield
(74) *Attorney, Agent, or Firm* — Yee & Associates, P.C.

(57) ABSTRACT

A method and apparatus for visualizing information. The method comprises displaying a current graphical element centrally in a graphical user interface. The current graphical element represents a current category for the information. Related graphical elements are displayed around the current graphical element. The related graphical elements correspond to related categories for the information and include a portion of the information for the related categories. A selected related graphical element from the related graphical elements is displayed centrally in place of the current graphical element when the selected related graphical element is selected. Categories that are related to a selected category corresponding to the selected related graphical element are identified. A display of the related graphical elements is changed to correspond to the related categories identified as being related to the selected category and include the portion of the information for the categories related to the selected category.

20 Claims, 9 Drawing Sheets

(56) References Cited

U.S. PATENT DOCUMENTS

| | | | |
|---|---|---|---|
| 2007/0079258 A1* | 4/2007 | Hsieh | G06F 3/03547 |
| | | | 715/853 |
| 2009/0150791 A1* | 6/2009 | Garcia | G06Q 30/08 |
| | | | 715/738 |
| 2009/0249453 A1 | 10/2009 | Cluck et al. | |
| 2013/0204881 A1* | 8/2013 | Su | G06N 5/043 |
| | | | 707/749 |
| 2014/0047310 A1* | 2/2014 | Potiagalov | G06F 17/30882 |
| | | | 715/205 |
| 2014/0380139 A1* | 12/2014 | Mondri | G06F 17/246 |
| | | | 715/212 |
| 2015/0212689 A1* | 7/2015 | Gomez-Rosado | |
| | | | G06F 3/04817 |
| | | | 715/765 |

OTHER PUBLICATIONS

"Mind map," Wikimedia Foundation, Inc., last modified Feb. 2016, 6 pages. https://en.wikipedia.org/wiki/Mind_map.

* cited by examiner

DATA ANALYSIS SYSTEM

BACKGROUND INFORMATION

Field

The present disclosure relates generally to an improved computer system and, in particular, to a method and apparatus for analyzing data using a dynamic data visualization system.

Background

Information systems are used for many different purposes. For example, an information system may be used to process payroll to generate paychecks for employees in an organization. Additionally, an information system also may be used by a human resources department to maintain benefits and other records about employees. For example, a human resources department may manage health insurance, wellness plans, and other programs and organizations using an employee information system. As yet another example, an information system may be used to determine when to hire new employees, assign employees to projects, perform reviews for employees, and other suitable operations for the organization. As another example, a research department in the organization may use an information system to store and analyze information to research new products, analyze products, or for other suitable operations.

Currently used information systems include databases. These databases store information about the organization. For example, these databases store information about employees, products, research, product analysis, business plans, and other information about the organization.

Information about the employees may be searched and viewed to perform various operations within an organization. However, this type of information in currently used databases may be cumbersome and difficult to search and analyze. Therefore, it would be desirable to have a method and apparatus that take into account at least some of the issues discussed above, as well as other possible issues. For example, it would be desirable to have a method and apparatus that overcome a technical problem with searching for information in databases.

SUMMARY

An embodiment of the present disclosure provides a method for visualizing information. The method comprises displaying, by a computer system, a current graphical element centrally in a graphical user interface on a display system, wherein the current graphical element represents a current category for the information in an information system. Further, the method comprises displaying, by the computer system, a group of related graphical elements around the current graphical element in the graphical user interface, wherein the group of related graphical elements corresponds to a group of related categories for the information in the information system and includes a portion of the information for the group of related categories. Yet further, the method comprises displaying, by the computer system, a selected related graphical element from the group of related graphical elements centrally in place of the current graphical element when the selected related graphical element is selected, wherein the selected related graphical element becomes the current graphical element. Still further, the method comprises identifying, by the computer system, a group of categories that is related to a selected category corresponding to the selected related graphical element, wherein the group of categories becomes the group of related categories. Still yet further, the method comprises changing, by the computer system, a display of the group of related graphical elements to correspond to the group of related categories identified as being related to the selected category and include the portion of the information for the group of related categories related to the selected category, enabling a visual analysis of the information.

Another embodiment of the present disclosure provides a computer system. The computer system comprises a display system and an information manager. The information manager is in communication with the display system, wherein the information manager displays a current graphical element centrally in a graphical user interface on the display system, wherein the current graphical element represents a current category for information in an information system. Further, the information manager displays a group of related graphical elements around the current graphical element in the graphical user interface, wherein the group of related graphical elements corresponds to a group of related categories for the information in the information system and includes a portion of the information for the group of related categories. Yet further, the information manager displays a selected related graphical element from the group of related graphical elements centrally in place of the current graphical element when the selected related graphical element is selected, wherein the selected related graphical element becomes the current graphical element. Still further, the information manager identifies a group of categories that is related to a selected category corresponding to the selected related graphical element, wherein the group of categories becomes the group of related categories. Still yet further, the information manager changes a display of the group of related graphical elements to correspond to the group of related categories identified as being related to the selected category and include the portion of the information for the group of related categories related to the selected category, enabling a visual analysis of the information.

Yet another embodiment of the present disclosure provides a computer program product for visualizing information. The computer program comprises a computer readable storage media, first program code, second program code, third program code, fourth program code, and fifth program code. The first program code, stored on the computer readable storage media, displays a current graphical element centrally in a graphical user interface on a display system, wherein a central element represents a current category for the information in an information system. The second program code, stored on the computer readable storage media, displays a group of related graphical elements around the current graphical element in the graphical user interface, wherein the group of related graphical elements corresponds to a group of related categories for the information in the information system and includes a portion of the information for the group of related categories. The third program code, stored on the computer readable storage media, displays a selected related graphical element from the group of related graphical elements centrally in place of the current graphical element when the selected related graphical element is selected, wherein the selected related graphical element becomes the current graphical element. The fourth program code, stored on the computer readable storage media, identifies a group of categories that is related to a selected category corresponding to the selected related graphical element, wherein the group of categories becomes the group of related categories. The fifth program code, stored on the computer readable storage media, changes a display of the group of related graphical elements to correspond to the group of related categories identified as being related to the selected category and include the portion of the information for the group of related categories related to the selected category, enabling a visual analysis of the information.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that currently used searching systems may return results in a number of different ways. For example, those embodiments recognize and take into account that searches may return links to documents, words, or other information that may be found in a search. The illustrative embodiments also recognize and take into account that the search results are not displayed in a manner that can be analyzed easily by a person performing the search. Database search engines often list titles of files found during the search. Search engines on the Internet return links and may include text from the documents identified.

The illustrative embodiments recognize and take into account that these types of presentations of search results do not provide any type of organization that is as helpful as desired to a person in identifying connections and relationships between results that may be returned. The illustrative embodiments recognize and take into account that the person may end up reviewing many documents that may not be as useful as desired, therefore increasing the time needed to research and analyze a particular topic or issue.

Thus, the illustrative embodiments provide a method and apparatus for visualizing information. In one illustrative example, the process displays, by a computer system, a central graphical element centrally in a graphical user interface on a display system, wherein the central element represents a current category for information in an information system. A group of related graphical elements is displayed around the current graphical element in the graphical user interface. The group of related graphical elements corresponds to a group of related categories for the information in the information system and includes a portion of the information for the group of related categories. A selected related graphical element from the group of related graphical elements is displayed centrally in place of the current graphical element when the selected related graphical element is selected, wherein the selected related graphical element becomes the current graphical element. A group of categories that is related to a selected category corresponding to the selected related graphical element is displayed, wherein the group of categories becomes the group of related categories. A display of the group of related graphical elements is changed to correspond to the group of related categories identified as being related to the selected category and include the portion of the information for the group of related categories related to the selected category, enabling a visual analysis of the information.

Figure 1:
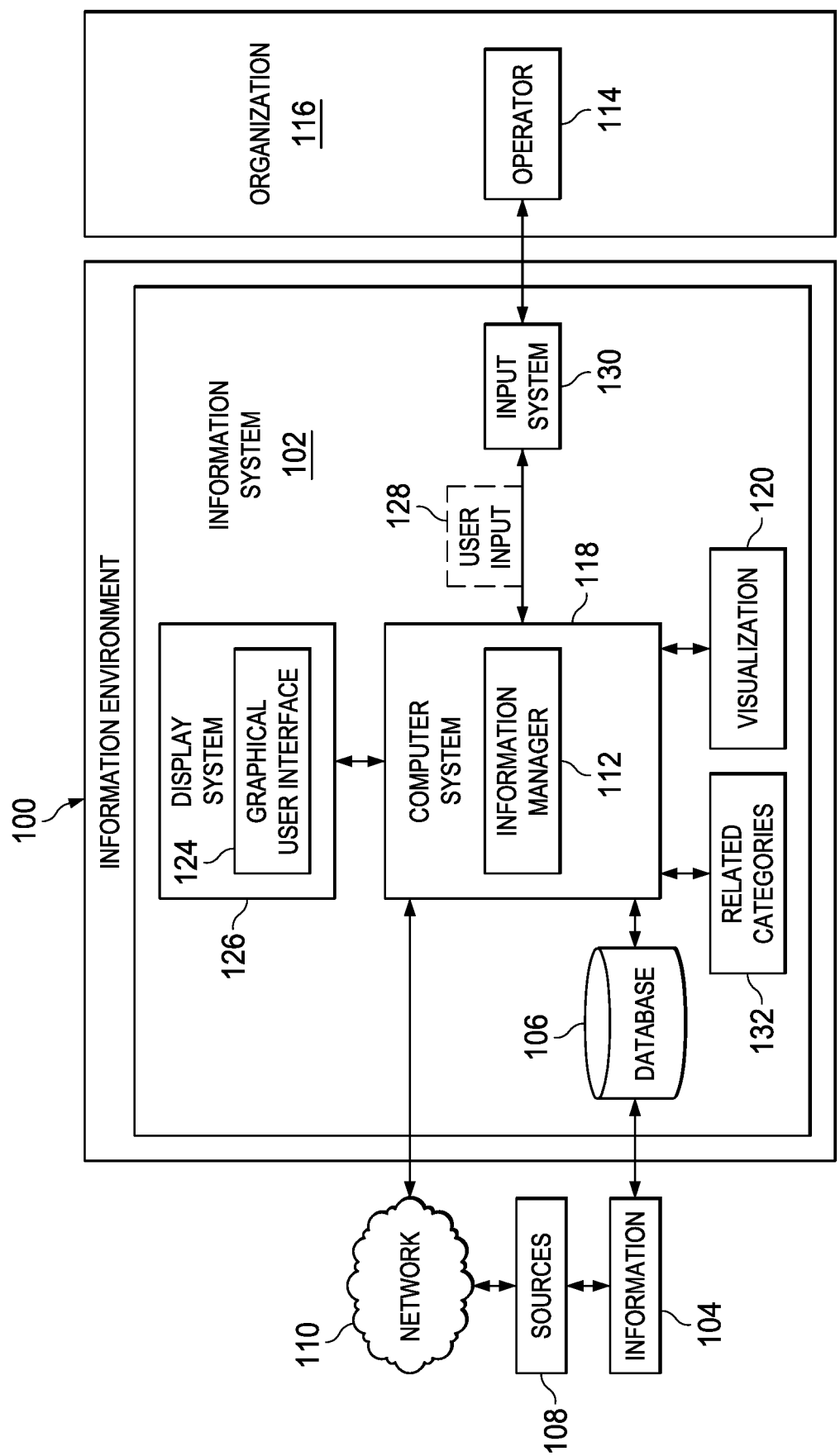
FIG. 1 is an illustration of a block diagram of an information environment in accordance with an illustrative embodiment.

With reference now to the figures and, in particular, with reference to FIG. 1, an illustration of a block diagram of an information environment is depicted in accordance with an illustrative embodiment. In this illustrative example, information environment 100 includes information system 102. Information system 102 manages information 104. Information 104 may take different forms. Information 104 has a form selected from one at least one of a chart, a spreadsheet, a key performance indicator, a table, a report, a pie chart, a line graph, a video, a website, or some other suitable type of information. Information 104 has different categories. For example, information 104 may be selected from at least one of demographics, diversity information, product information, jobs data, research, product analysis, business plans, financials, retention information, human resources information, or other categories of information.

In this illustrative example, information 104 may be located in a number of different locations. As used herein, "a number of", when used with reference to items, means one or more items. For example, "a number of different locations" is one or more different locations.

As depicted, information 104 may be stored in at least one of database 106 in information system 102 or in a number of sources 108 accessed through network 110. As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Network 110 may be any type of network that may be used to access sources 108. For example, network 110 may be selected from at least one of an intranet, the Internet, a wide area network, a local area network, or some other suitable type of network.

Sources 108 also may take different forms. For example, sources 108 may be selected from at least one of a Web server, a network server, a storage system, a proxy server, or some other suitable form.

In this illustrative example, information manager 112 is configured to provide access to information 104. For example, information manager 112 may provide operator 114 in organization 116 access to information 104.

Operator 114 is a person in organization 116. Organization 116 may be, for example, a corporation, a partnership, a charitable organization, a city, a government agency, or some other suitable type of organization.

In the illustrative example, information manager 112 manages access to information 104. Information manager 112 may be implemented in software, hardware, firmware, or a combination thereof. When software is used, the operations performed by information manager 112 may be implemented in program code configured to run on hardware, such as a processor unit. When firmware is used, the operations performed by information manager 112 may be implemented in program code and data and stored in persistent memory to run on a processor unit. When hardware is employed, the hardware may include circuits that operate to perform the operations in information manager 112.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In this illustrative example, information manager 112 may be located in computer system 118. Computer system 118 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

Information manager 112 creates visualization 120 for information 104. Visualization 120 may include some or all of information 104. Information manager 112 displays visualization 120 in graphical user interface 124 on display system 126 for viewing by operator 114.

Display system 126 is a physical hardware system and includes one or more display devices on which graphical user interface 124 may be displayed. The display devices may include at least one of a light emitting diode (LED) display, a liquid crystal display (LCD), an organic light emitting diode (OLED) display, or some other suitable device on which graphical user interface 124 can be displayed. Operator 114 is a person that may interact with graphical user interface 124 through user input 128 generated by input system 130 for computer system 118. Input system 130 is a physical hardware system and may be selected from at least one of a mouse, a keyboard, a trackball, a touchscreen, a stylus, a motion sensing input device, a cyberglove, or some other suitable type of input device.

During operation, information manager 112 is in communication with display system 126. Information manager 112 displays visualization 120 in a manner that is more helpful to operator 114 as compared to currently used information systems. Information manager 112 displays related categories 132 for information 104 to operator 114 in graphical user interface 124 on display system 126 in a manner that is nonhierarchical. Additionally, related categories 132 of information 104 may also be displayed in a manner that is dynamic.

Figure 2:
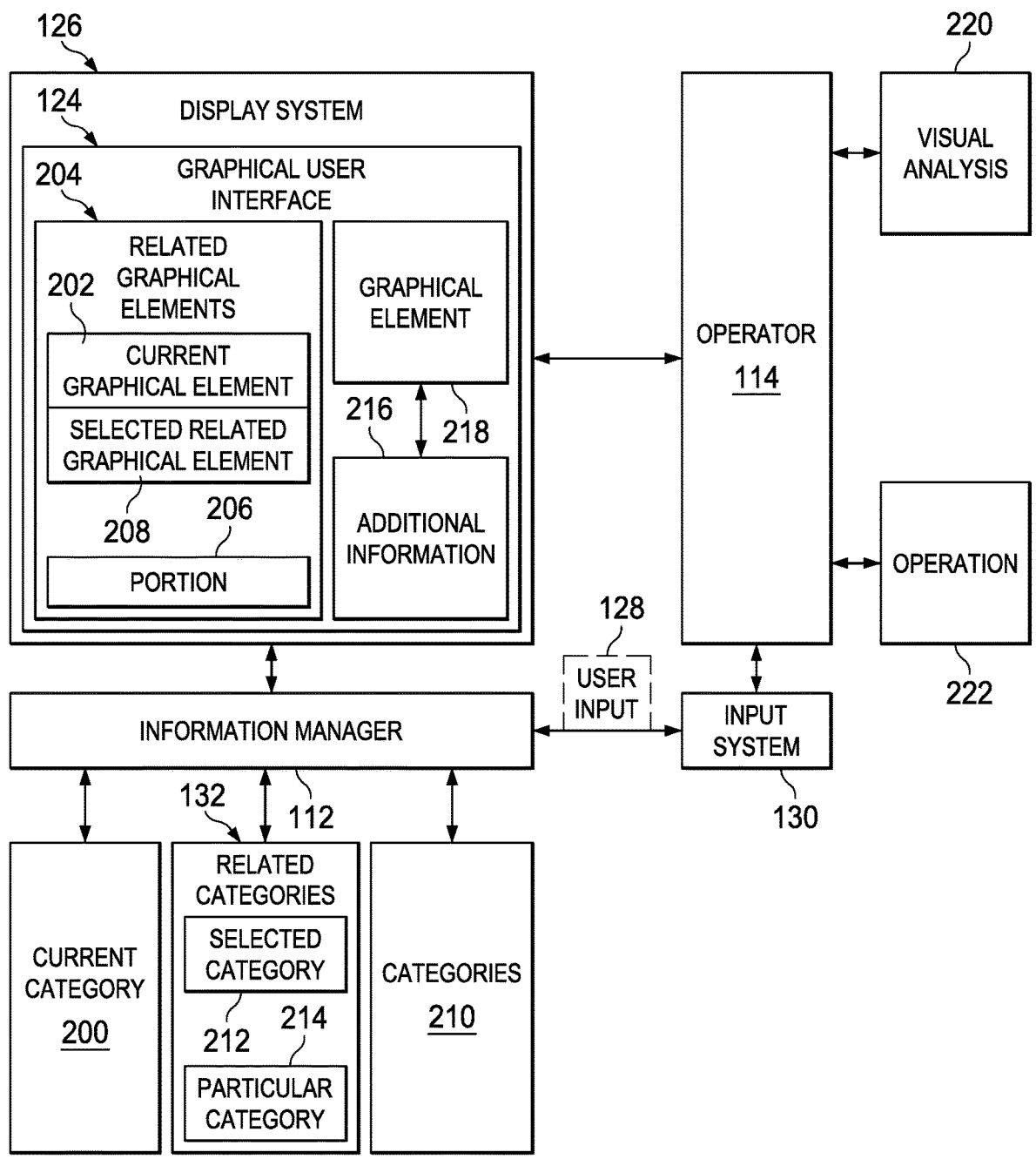
FIG. 2 is an illustration of a block diagram of dataflow in displaying a visualization of information in a graphical user interface on a display system in accordance with an illustrative embodiment.

With reference next to FIG. 2, an illustration of a block diagram of dataflow in displaying a visualization of information in a graphical user interface on a display system is depicted in accordance with an illustrative embodiment. In this illustrative example, information manager 112 identifies current category 200 for information 104, as shown in block form in FIG. 1. Information manager 112 also identifies a group of related categories 132 that is related to current category 200 for information 104.

Information manager 112 in computer system 118, as shown in block form in FIG. 1, displays current graphical element 202 centrally in graphical user interface 124 on display system 126. In this illustrative example, being displayed centrally means that current graphical element 202 is displayed at the center or near the center of graphical user interface 124. Further, if visualization 120, as shown in block form in FIG. 1, is displayed within a display element, current graphical element 202 is displayed centrally within the display element. The display element may be, for example, a frame, a window, or some other manner of displaying visualization 120. For example, if visualization 120 is displayed within a frame in a browser, current graphical element 202 is displayed centrally within the frame.

Current graphical element 202 represents current category 200 for information 104 in information system 102, as shown in block form in FIG. 1. Information manager 112 also displays a group of related graphical elements 204 around current graphical element 202 in graphical user interface 124. The group of related graphical elements 204 corresponds to a group of related categories 132 for information 104 in information system 102, and includes portion 206 of information 104 for the group of related categories 132.

Information manager 112 also displays selected related graphical element 208 from the group of related graphical elements 204 centrally in place of current graphical element 202 when selected related graphical element 208 is selected. In this example, selected related graphical element 208 may be selected through user input 128 generated by operator 114 interacting with graphical user interface 124 using input system 130. As depicted, selected related graphical element 208 becomes current graphical element 202.

Information manager 112 identifies a group of categories 210 for information 104 that is related to selected category 212 corresponding to selected related graphical element 208. The group of categories 210 becomes the group of related categories 132. Information manager 112 changes the display of the group of related graphical elements 204 to correspond to the group of related categories 132 identified as being related to selected category 212 and include portion 206 of information 104 for the group of related categories 132 related to selected category 212.

The different steps described in this dataflow may be repeated each time a related graphical element in the group of related graphical elements 204 in visualization 120 is selected as selected related graphical element 208. In this manner, additional related categories may be identified and displayed to operator 114 using graphical elements in the manner described for FIG. 2.

Further, when operator 114 sees particular category 214 in the group of related categories 132 that is of interest, operator 114 may obtain more information about particular category 214. For example, information manager 112 may display additional information 216 for particular category 214 when graphical element 218 corresponding to particular category 214 is selected by user input 128 requesting additional information 216. Graphical element 218 may be selected from at least one of current graphical element 202 or the group of related graphical elements 204.

In the illustrative example, the operation of information manager 112 to generate visualization 120, as shown in block form in FIG. 1, enables visual analysis 220 of information 104, as shown in block form in FIG. 1, by operator 114. With visual analysis 220, operator 114 may perform operation 222. Operation 222 may be with respect to organization 116, as shown in block form in FIG. 1. Operation 222 may be selected from one of a hiring decision, a human resources change, researching a product, performing a review, creating an ad campaign, making a compensation change, selecting a person for a team, or some other suitable type of operation.

Figure 3:
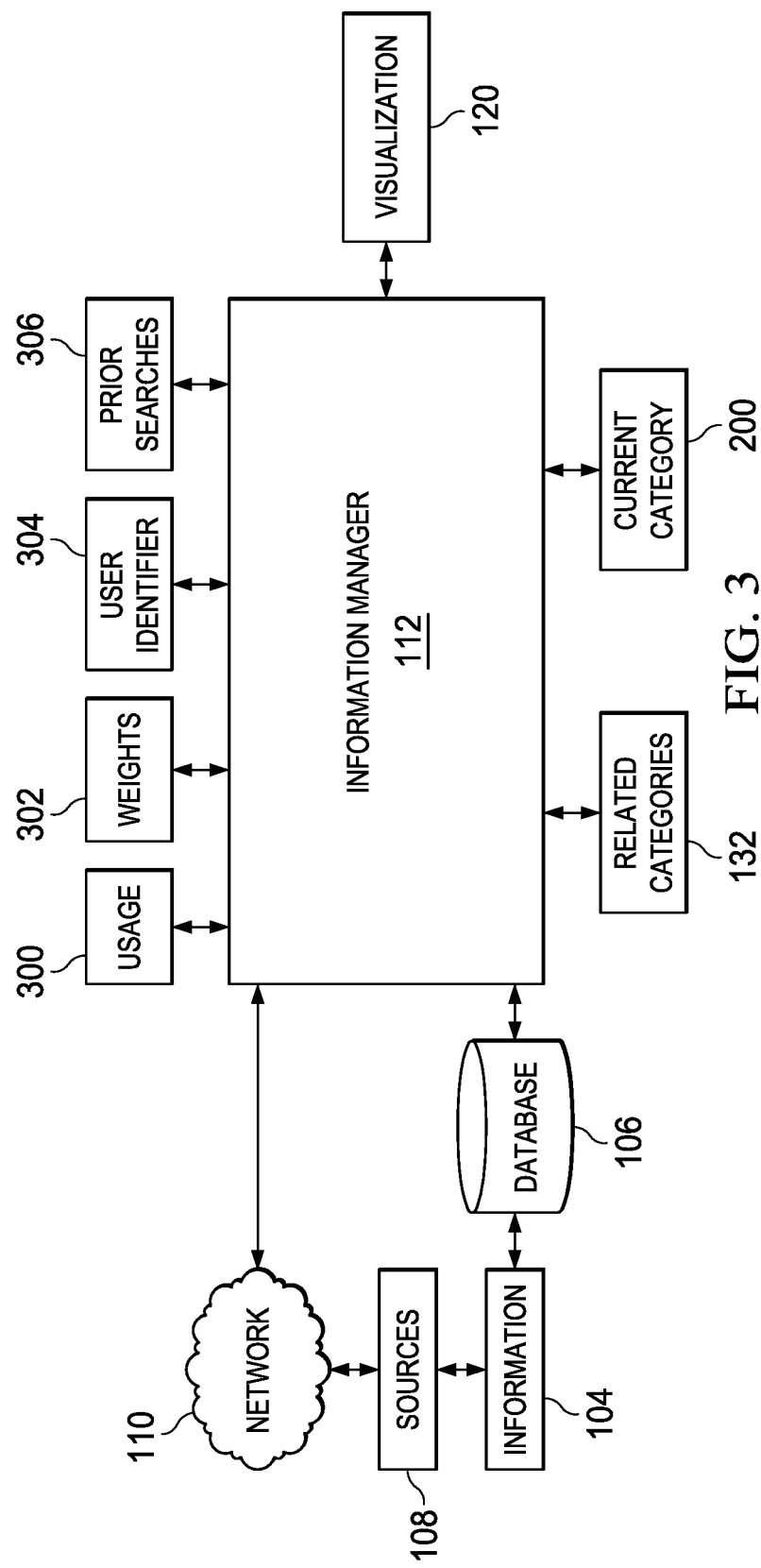
FIG. 3 is an illustration of dataflow for selecting categories in accordance with an illustrative embodiment.

With reference now to FIG. 3, an illustration of dataflow for selecting categories is depicted in accordance with an illustrative embodiment. As depicted, information manager 112 identifies related categories 132 for current category 200.

As depicted, information manager 112 decides how many of related categories 132 for current category 200 should be displayed in graphical user interface 124, as shown in block form in FIGS. 1-2. This determination is made using a number of factors. For example, screen size, user preferences, and other factors may be used in identifying how many of related categories 132 should be displayed.

Once the number of related categories 132 is identified, information manager 112 selects which ones of related categories 132 should be included in the group of related categories 132. The group of related categories 132 may be displayed using the group of related graphical elements 204, as shown in block form in FIG. 2, corresponding to the group of related categories 132.

This determination may be made in a number of ways. For example, information manager 112 analyzes information 104 located in at least one of database 106 or sources 108. This analysis may be performed using a statistical-based process that is configured to analyze information 104 from multiple sources, such as sources 108 and database 106.

As depicted, the selection may be made based on tracking usage 300 of information 104 in related categories 132 that have been identified. For example, a ranking of the most used categories in related categories 132 may be made. Information manager 112 then selects the top ranked categories in related categories 132 for the group of related categories 132.

In another example, information manager 112 selects the group of related categories 132 using weights 302. As depicted, weights 302 are values used to determine the relative weighing or importance of one category versus another category in related categories 132 to select the group of related categories 132.

Weights 302 for the related categories 132 may be selected in a number of different ways. For example, weights 302 may be based on an identification of what operator 114, as shown in block form in FIGS. 1-2, should review for current category 200. Organization 116, as shown in block form in FIGS. 1-2, may desire to highlight department-based data instead of location-based data in related categories 132. As another example, weights 302 may give greater weighing to benchmarks that are available when a relevant fact to current category 200 is present.

These and other types of mechanisms may be used to select the group of related categories 132 that are presented in graphical user interface 124, as shown in block form in FIGS. 1-2, using the group of related graphical elements 204, as shown in block form in FIG. 2, corresponding to the group of related categories 132.

Further, the selection of the group of related categories 132 may be identified based on user identifier 304. In other words, different operators entering different user identifiers may result in different categories being selected for the group of related categories 132. Further, portion 206, as shown in block form in FIG. 2, that is selected also may vary depending on user identifier 304. Thus, at least one of the group of related categories 132 for information 104 in information system 102, as shown in block form in FIG. 1, or portion 206 of information 104 for the group of related categories 132 may be different for different operators of graphical user interface 124.

Further, prior searches 306 are an example of another mechanism that may be used to select the group of related categories 132 from related categories 132. Prior searches 306 may be search results returned from the queries made by operator 114, as shown in block form in FIG. 1, or other operators at a prior time. In other words, the history of the search results may be used to identify the group of related categories 132 for use in creating visualization 120.

Further, at least one of the group of related categories 132, information 104 in the group of related categories 132, or portion 206 displayed in the group of related graphical elements 204, as shown in block form in FIG. 2, may change over time. For example, usage 300, weights 302, user identifier 304, prior searches 306, or some combination thereof may change over time. These changes may result in information manager 112 selecting different categories in related categories 132 as the group of related categories 132 that is used to generate visualization 120 in graphical user interface 124 on display system 126, as shown in block form in FIGS. 1-2.

As another illustrative example, information manager 112 may select additional information 216 for portion 206 displayed for particular category 214, as shown in block form in FIG. 2, in the group of related categories 132 based on statistics of what types of information 104 are useful. User input 128, as shown in block form in FIGS. 1-2, may be received in information 104 indicating the helpfulness of different portions of information 104. For example, user input 128 may be requested to indicate whether a particular chart or report was used.

In one illustrative example, one or more technical solutions are present that overcome a technical problem with searching for information 104. As a result, one or more technical solutions may provide a technical effect in which information 104 is presented more efficiently for performing visual analysis 220, as shown in block form in FIG. 2.

As a result, computer system 118, as shown in block form in FIG. 1, operates as a special purpose computer system in which information manager 112 in computer system 118 enables displaying information 104 visually in visualization 120 in which current category 200 is displayed centrally with related categories 132 being displayed around current category 200 using graphical elements and portion 206 of information 104 being displayed in the graphical elements. Further, the selection of related categories 132 is dynamic and may change over at least one of time or operators requesting information 104. Thus, information manager 112 transforms computer system 118 into a special purpose computer system as compared to currently available general computer systems that do not have information manager 112. Computer system 118 performs a transformation of data from information 104, as stored in at least one of database 106 or sources 108, into visualization 120 as described in the different illustrative examples.

The illustration of information environment 100 and the different components in FIGS. 1-3 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more operators in addition to or in place of operator 114, as shown in block form in FIGS. 1-2, may access information 104 through information system 102 in information environment 100, as shown in block form in FIG. 1, using information manager 112. When multiple operators interact with information manager 112 to obtain visualizations of information 104, information manager 112 may employ multithreading using a process unit that is configured to handle running multiple processes or threads concurrently. The process is an instance of a computer program, and a thread is the smallest sequence of instructions that can be managed independently by a scheduler in an operating system.

Each operator may be assigned a group of threads to generate the visualization and process user input to the visualization for each operator. For example, the visualization and interaction with the visualization on a graphical user interface may be handled by a group of threads assigned to each operator. For example, user input selecting a graphical element, such as selected related graphical element 208, each of the visualization may be performed for each operator using a separate thread.

As another example, a separate group of threads may be used to perform statistical analysis to identify at least one of usage 300, weights 302, prior searches 306, and other factors for dynamically selecting the group of related categories 132. With a separate group of threads from the group of threads used by operator 114, changes in the group of related categories 132 may occur dynamically while operator 114 is accessing information 104 and viewing visualization 120.

For example, if operator 114 selects selected related graphical element 208, identifying the group of categories 210 to select a category may be different at different points in time. In this manner, visualization 120 may be dynamic and more up-to-date using multithreading in information manager 112.

Figure 4:
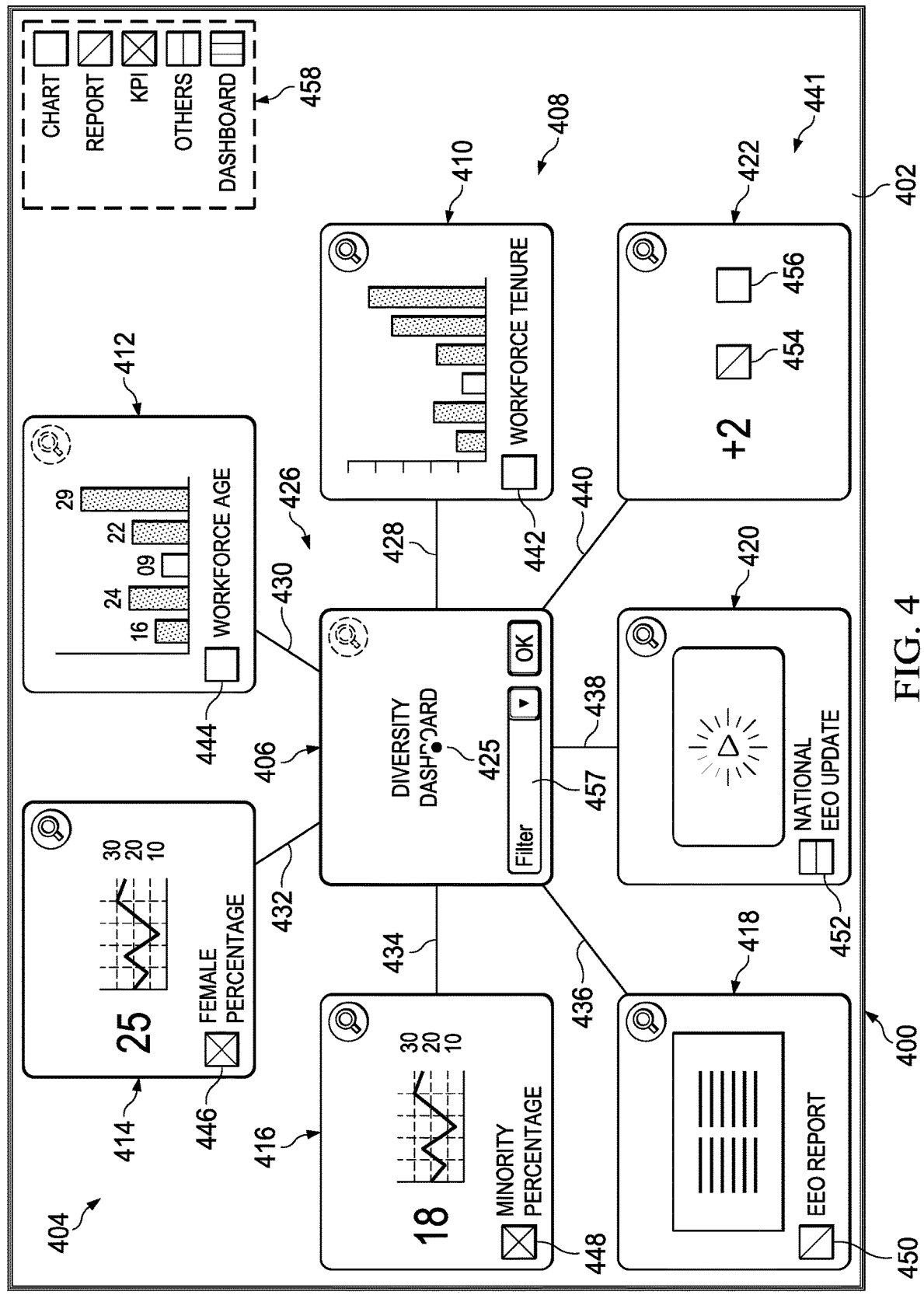
FIG. 4 is an illustration of a visualization of categories in a graphical user interface in accordance with an illustrative embodiment.
Figure 5:
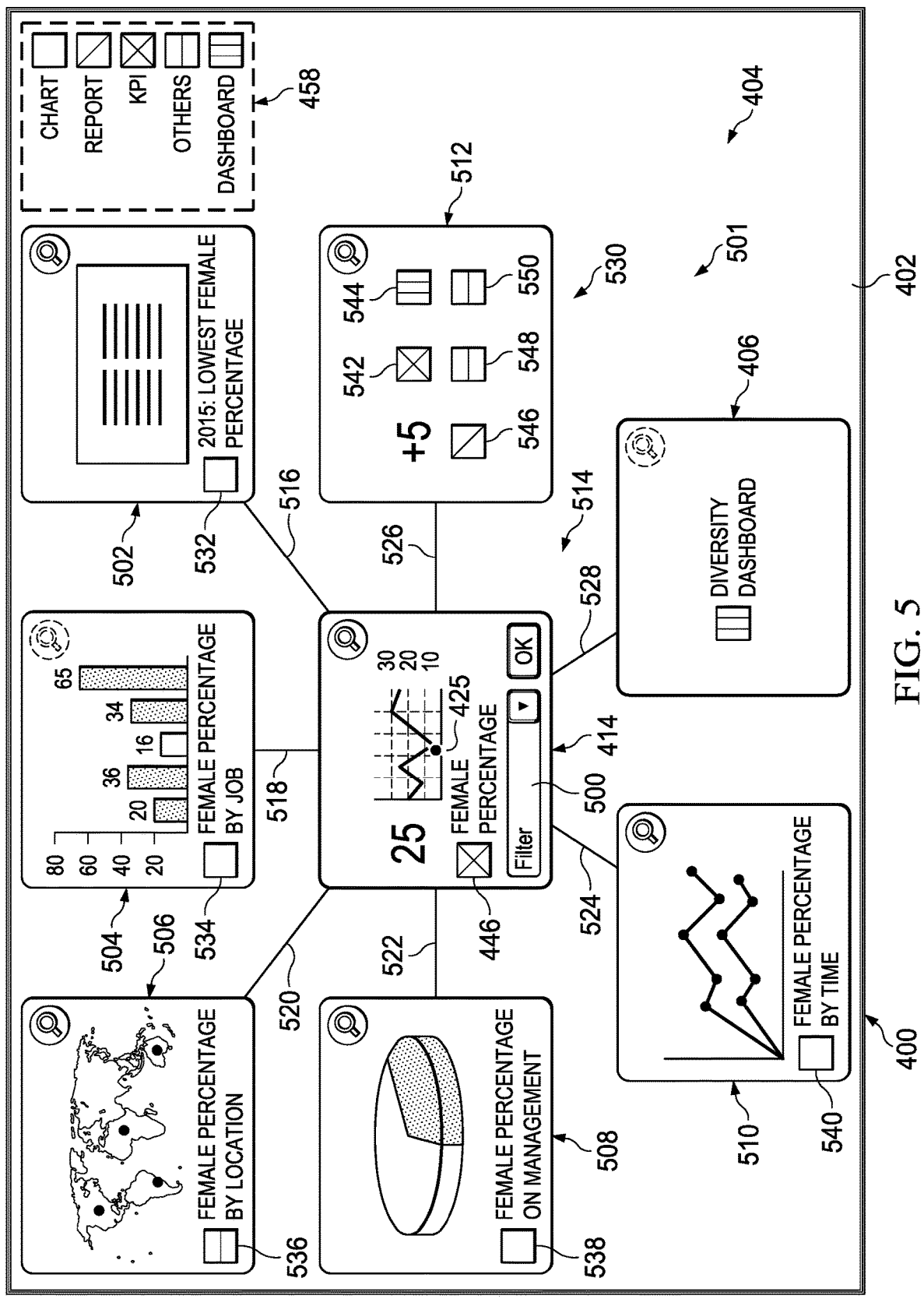
FIG. 5 is an illustration of a visualization of a change in categories in a graphical user interface in accordance with an illustrative embodiment.
Figure 6:
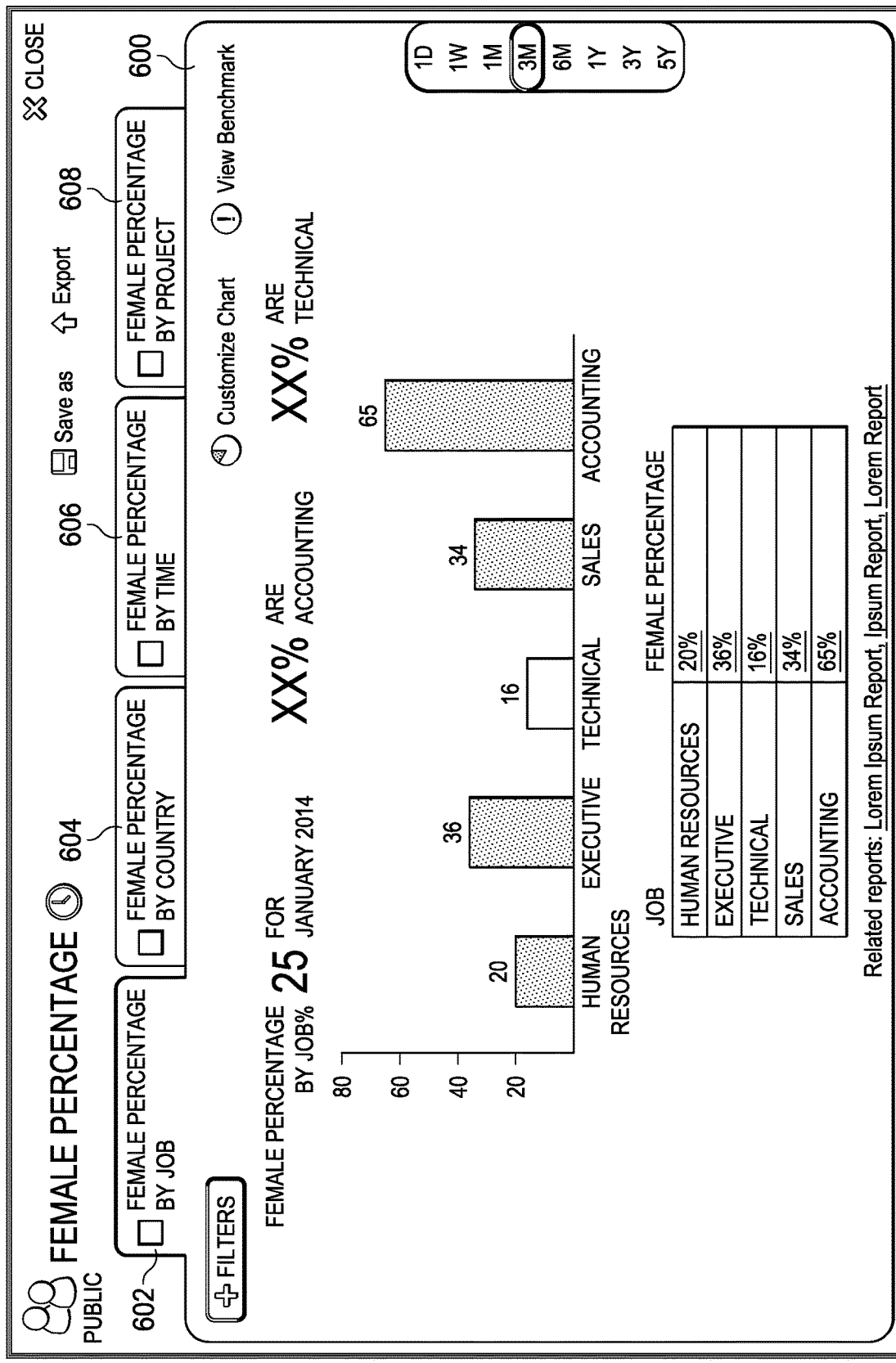
FIG. 6 is an illustration of information for a category in accordance with an illustrative embodiment.

FIGS. 4-6 illustrate interactions with a visualization of information displayed in a graphical user interface in accordance with an illustrative embodiment. With reference first to FIG. 4, an illustration of a visualization of categories in a graphical user interface is depicted in accordance with an illustrative embodiment. As depicted, graphical user interface 400 is an example of an implementation for graphical user interface 124, as shown in block form in FIGS. 1-2.

In this example, visualization 402 includes graphical elements 404 representing categories of information. Graphical elements 404 include current graphical element 406 and a group of related graphical elements 408. The group of related graphical elements 408 includes related graphical element 410, related graphical element 412, related graphical element 414, related graphical element 416, related graphical element 418, related graphical element 420, and related graphical element 422.

Current graphical element 406 is displayed centrally within graphical user interface 400 and is an example of current graphical element 202, as shown in block form in FIG. 2. In this example, current graphical element 406 is displayed in center 425 in visualization 402 in graphical user interface 400. In this example, related graphical element 410, related graphical element 412, related graphical element 414, related graphical element 416, related graphical element 418, related graphical element 420, and related graphical element 422 are displayed around current graphical element 406 and are examples of related graphical elements 204, as shown in block form in FIG. 2.

As depicted, related graphical elements 408 are connected to current graphical element 406 by connectors 426. Connectors 426 visually indicate an association with current graphical element 406. Connectors 426 include connector 428, connector 430, connector 432, connector 434, connector 436, connector 438, and connector 440.

In the illustrative example, connector 428 connects related graphical element 410 to current graphical element 406; connector 430 connects related graphical element 412 to current graphical element 406; connector 432 connects related graphical element 414 to current graphical element 406; connector 434 connects related graphical element 416 to current graphical element 406; connector 436 connects related graphical element 418 to current graphical element 406; connector 438 connects related graphical element 420 to current graphical element 406; and connector 440 connects related graphical element 422 to current graphical element 406.

Additionally, related graphical elements 408 indicate the type of information in categories represented by graphical elements 404. The type of information is represented by graphical indicators 441 displayed in related graphical elements 408. For example, related graphical element 410 has graphical indicator 442; related graphical element 412 has graphical indicator 444; related graphical element 414 has graphical indicator 446; related graphical element 416 has graphical indicator 448; related graphical element 418 has graphical indicator 450; related graphical element 420 has graphical indicator 452; and related graphical element 422 has graphical indicator 454 and graphical indicator 456.

In this depicted example, current graphical element 406 is the initial graphical element displayed centrally in graphical user interface 400 and does not have any information associated with it. Current graphical element 406 identifies an analysis that may be made by an operator. In this example, current graphical element 406 is a "Diversity Dashboard".

Legend 458 in visualization 402 identifies the type of information in each category corresponding to related graphical elements 408. For example, graphical indicator 442, graphical indicator 444, and graphical indicator 456 show that the corresponding related graphical elements are for categories containing charts. Graphical indicator 446 and graphical indicator 448 show that the corresponding related graphical elements are for categories containing key performance indicators (KPI's). Graphical indicator 450 and graphical indicator 454 show that the corresponding related graphical elements are for categories containing reports. Graphical indicator 452 shows that the corresponding related graphical element is for a category containing other types of information.

Additionally, each of related graphical elements 408 includes a portion of the information in the categories that they represent. For example, related graphical element 410 includes information about workforce tenure in the form of a chart; related graphical element 412 includes information about workforce age in the form of a chart; and related graphical element 414 includes information about female percentages in the form of a key performance indicator report. Related graphical element 416 includes information about minority percentages in the form of a key performance indicator report, and related graphical element 418 includes information from an equal employment opportunity (EEO) report. Related graphical element 420 includes other types of information for a national equal employment opportunity (EEO) update.

The amount of information displayed in each of related graphical elements 408 may vary depending on the particular implementation. The amount of information may be selected to provide the viewer sufficient information to determine whether a particular category may be one of interest for the analysis being performed.

As depicted, related graphical element 422 represents additional categories that were too numerous to show in individual related graphical elements in graphical user interface 400. Related graphical element 422 does not shown information about categories, but shows two additional categories of information that are available but not seen in graphical user interface 400. In this manner, additional categories of information may be indicated as being present.

In this example, related graphical element 422 indicates that two additional categories are present, but not shown in visualization 402. The two additional categories are ones that are present but are not as important as the ones displayed in visualization 402.

As an additional feature, current graphical element 406 also includes filter function 457. For example, filter function 457 may be used to select information in the categories. For example, an operator may desire to see the different categories for a particular location or department. This filtering may be performed using filter function 457 in current graphical element 406.

With reference now to FIG. 5, an illustration of a visualization of a change in categories in a graphical user interface is depicted in accordance with an illustrative embodiment. In this depicted example, related graphical element 414 has been selected by user input. Selection of related graphical element 414 results in related graphical element 414 moving to center 425 in visualization 402 in graphical user interface 400.

As depicted, related graphical element 414 takes the place of current graphical element 406 in FIG. 4. Related graphical element 414 now becomes the current graphical element. Additionally, related graphical element 414 now includes filter function 500. Current graphical element 406 moves to a position around related graphical element 414.

Additionally, related graphical elements 501 are identified for categories that are related to the category for related graphical element 414. In this illustrative example, related graphical elements 501 include related graphical element 502, related graphical element 504, related graphical element 506, related graphical element 508, related graphical element 510, and related graphical element 512. As shown in this figure, related graphical elements 501 are arranged around related graphical element 414.

In this view, connectors 514 are displayed in association with related graphical element 414 in visualization 402. As depicted, connector 516 connects related graphical element 502 to related graphical element 414; connector 518 connects related graphical element 504 to related graphical element 414; connector 520 connects related graphical element 506 to related graphical element 414; connector 522 connects related graphical element 508 to related graphical element 414; connector 524 connects related graphical element 510 to related graphical element 414; and connector 526 connects related graphical element 512 to related graphical element 414. Also, connector 528 connects current graphical element 406 to related graphical element 414.

As depicted, related graphical elements 501 include graphical indicators 530 that show the type of information in the categories corresponding to related graphical elements 501. Related graphical element 502 has graphical indicator 532; related graphical element 504 has graphical indicator 534; related graphical element 506 has graphical indicator 536; related graphical element 508 has graphical indicator 538; related graphical element 510 has graphical indicator 540; and related graphical element 512 has graphical indicator 542, graphical indicator 544, graphical indicator 546, graphical indicator 548, and graphical indicator 550.

Related graphical element 502, related graphical element 504, related graphical element 506, related graphical element 508, and related graphical element 510 also include information from the categories that correspond to these related graphical elements. In this illustrative example, related graphical element 512 shows that five additional categories of information related to related graphical element 414 are present, but not displayed in visualization 402.

In this illustrative example, current graphical element 406 is still shown in visualization 402. Selection of current graphical element 406 moves current graphical element 406 back to center 425 and changes visualization 402 back to the form displayed in FIG. 4.

In other words, keeping the prior current graphical element in visualization 402 allows for the operator to return to the prior visualization. For example, if another one of related graphical elements 501 shown in visualization 402 in this figure is selected, the selected related graphical element becomes the current graphical element, and related graphical element 414 is connected to the new current graphical element to allow for a traversal back to visualization 402 in the form shown in FIG. 5.

The selection of related graphical elements 501 for categories may occur repeatedly with the selected related graphical elements 501 being displayed centrally at center 425. New related graphical elements are identified for categories that are related to the category corresponding to the selected related graphical element that is moved into focus at center 425.

In this manner, an operator may traverse through different categories of information in a more efficient manner as compared to reviewing database results and searches from search engines. This visualization provides an ability for an operator to more easily see what categories of information may be related to a particular category of information.

Turning now to FIG. 6, an illustration of information for a category is depicted in accordance with an illustrative embodiment. Chart 600 is for female percentage and is displayed in visualization 402 in graphical user interface 400 when related graphical element 504 in FIG. 5 is selected as a category for which more information is desired.

For example, an operator may view related graphical element 504 and the information about female percentages displayed within related graphical element 504. When the operator desires to see more detailed information about female percentages, the operator may select related graphical element 504 to see a more detailed version of the chart shown in related graphical element 504.

The current information shown in chart 600 is female percentage by job for tab 602. This information shows additional detail not shown in related graphical element 504. Additionally, chart 600 also includes tab 604, tab 606, and tab 608. These tabs may be selected for viewing additional information about female percentage. For example, tab 604 provides information about female percentage by country, tab 606 provides information about female percentage by time, and tab 608 provides information about female percentage by project.

The illustration for visualization 402 in graphical user interface 400 in FIGS. 4-6 is presented for purposes of illustrating one manner in which visualization 120 in graphical user interface 124, as shown in block form in FIG. 1, may be implemented. The illustrations in these figures are not mean to limit the manner in which visualization 120 in graphical user interface 124 may be implemented in other illustrative examples.

For example, visualization 402 may be displayed in a frame, a window, or some other graphical element within graphical user interface 400. In this instance, center 425, as shown in FIGS. 4-5, is the center of visualization 402 and is located within the center of the frame or window, rather than within graphical user interface 400 as shown in the depicted examples.

Figure 7:
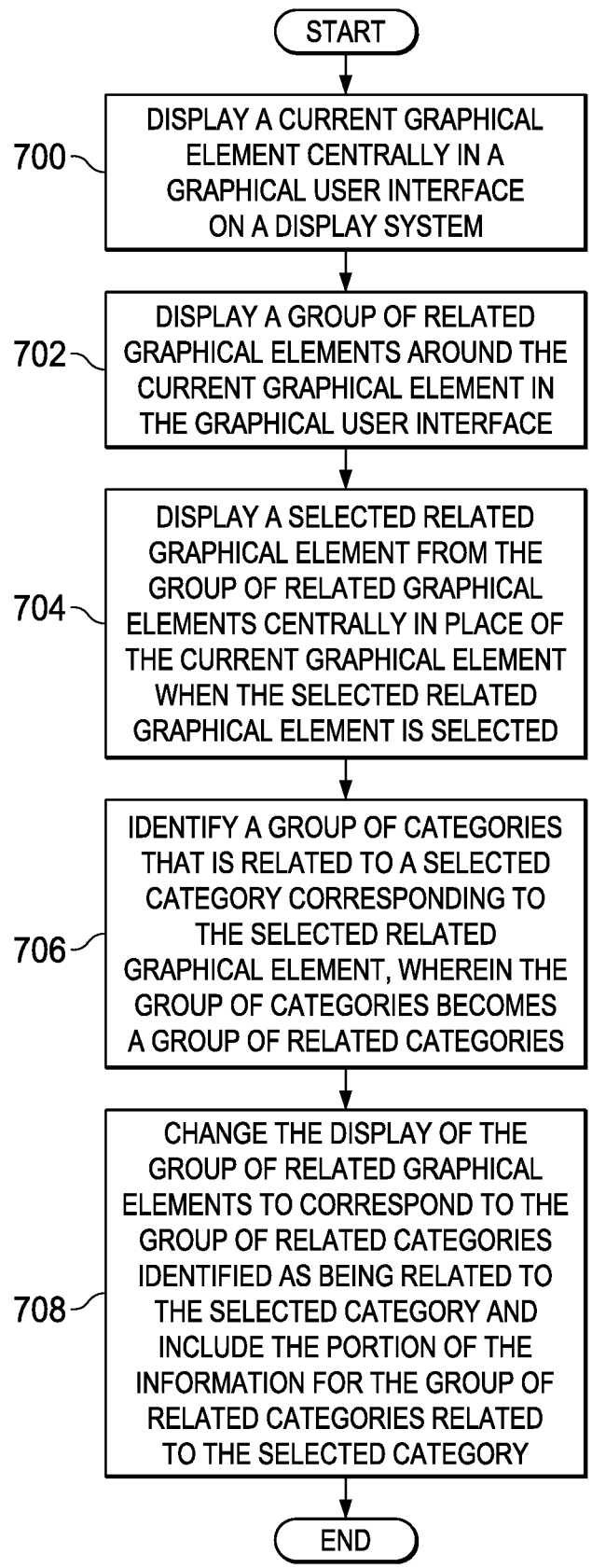
FIG. 7 is a flowchart of a process for visualizing information in accordance with an illustrative embodiment.

Turning next to FIG. 7, a flowchart of a process for visualizing information is depicted in accordance with an illustrative embodiment. The process illustrated in FIG. 7 is implemented in information environment 100, as shown in block form in FIG. 1. For example, the process illustrated may be implemented in information manager 112 to create and manage visualization 120 in graphical user interface 124 on display system 126.

The process begins by displaying a current graphical element centrally in a graphical user interface on a display system (step 700). The current graphical element represents a current category for information in an information system. A group of related graphical elements is displayed around the current graphical element in the graphical user interface (step 702). The group of related graphical elements corresponds to a group of related categories for the information in the information system and includes a portion of the information for the group of related categories.

The process displays a selected related graphical element from the group of related graphical elements centrally in place of the current graphical element when the selected related graphical element is selected (step 704). The selected related graphical element becomes the current graphical element. The process identifies a group of categories that is related to a selected category corresponding to the selected related graphical element, wherein the group of categories becomes a group of related categories (step 706). The process changes the display of the group of related graphical elements to correspond to the group of related categories identified as being related to the selected category, and include the portion of the information for the group of related categories related to the selected category (step 708) with the process terminating thereafter. The process in FIG. 7 enables a visual analysis of the information. With the visual analysis, an operation may be performed.

Figure 8:
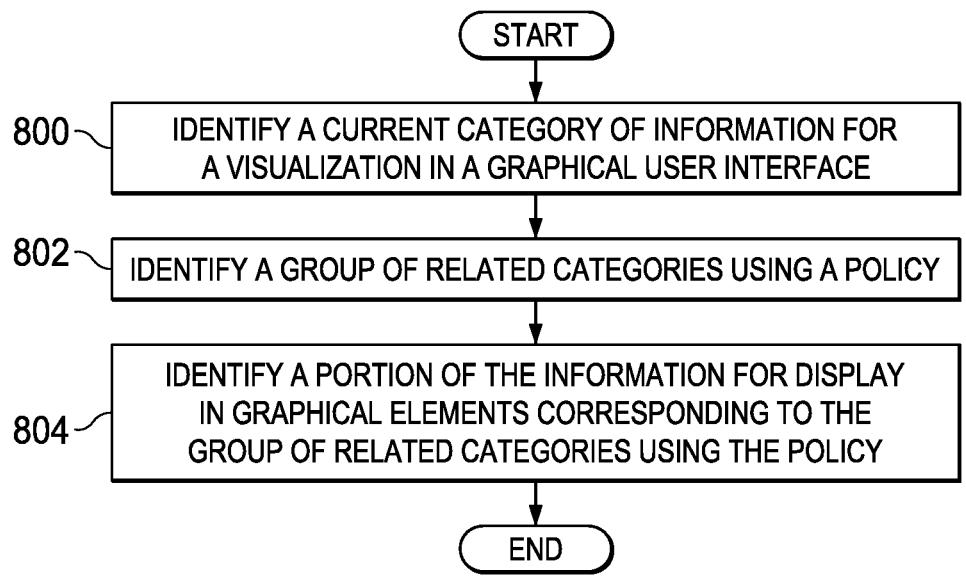
FIG. 8 is a flowchart of a process for selecting related categories of information in accordance with an illustrative embodiment.

With reference next to FIG. 8, a flowchart of a process for selecting related categories of information is depicted in accordance with an illustrative embodiment. The process illustrated in FIG. 8 may be implemented in information manager 112, as shown in block form in FIGS. 1-3. This process selects related categories of information that are related to the current category of information.

The process begins by identifying a current category of information for a visualization in a graphical user interface (step 800). The current category may be identified in a number of different ways. For example, the current category may be a default one that is selected for an initial display of the visualization for the information. In another illustrative example, the current category may be selected through user input identifying the starting category.

The process then identifies a group of related categories using a policy (operation 802). The policy identifies what factors may be used in identifying the group of related categories. For example, the policy may specify that at least one of usage, weights, user identifiers, prior searches, or other suitable factors may be used. These different factors may change over time. As a result, identifying related categories for the same current category at another point in time may result in different related categories being identified for the group of related categories to the current category. Further, different operators also may result in different categories being selected, even if the visualization is made at the same time for the two different operators. For example, the policy may specify that the group of related categories for the information in the information system is identified based on at least one of a user identifier or prior searches for the information relating to the current category.

The process then identifies a portion of the information for display in graphical elements corresponding to the group of related categories using the policy (step 804). The process terminates thereafter. In this example, the policy also may include one or more rules for determining what information should be displayed in the visualization of the categories.

In this manner, the visualization of information displayed in the graphical user interface is dynamic. The categories selected change based on at least one of time or user identifiers.

Figure 9:
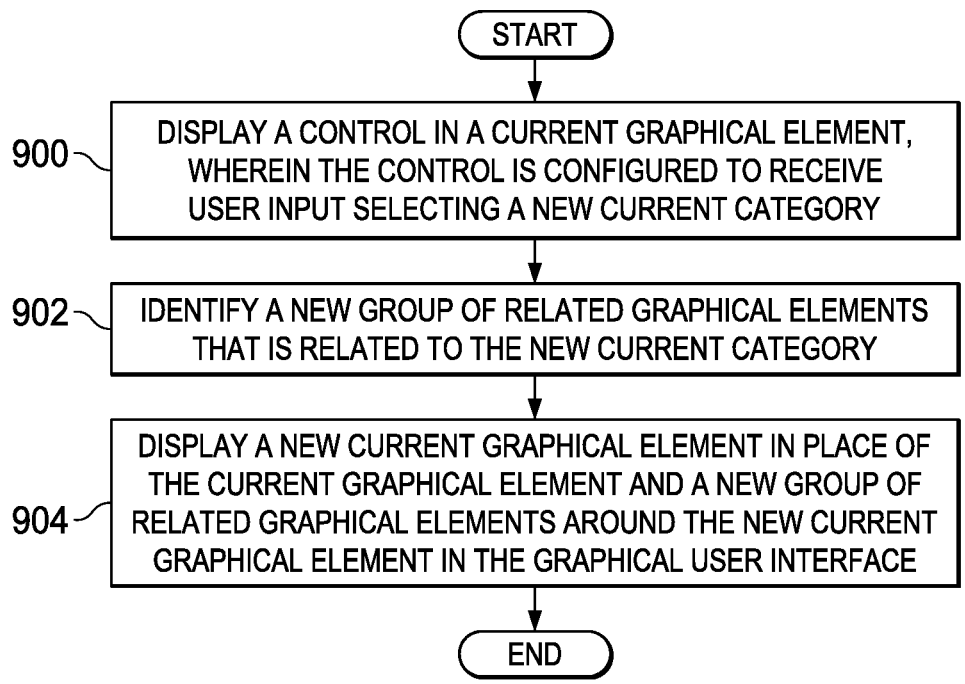
FIG. 9 is a flowchart of a process for filtering information in accordance with an illustrative embodiment.

With reference next to FIG. 9, a flowchart of a process for filtering information is depicted in accordance with an illustrative embodiment. This process selects another starting category accessing information.

The process begins by displaying a control in a current graphical element, wherein the control is configured to receive user input selecting a new current category (step 900). The control may be a drop-down menu with selections for other categories that may be used in place of the current category.

The process then identifies a new group of related graphical elements that is related to the new current category (step 902). The process displays a new current graphical element in place of the current graphical element and a new group of related graphical elements around the new current graphical element in the graphical user interface (step 904) with the process terminating thereafter. The new group of related graphical elements corresponds to a new group of related categories for the information in the information system and includes a portion of the information for the new group of related categories.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 10:
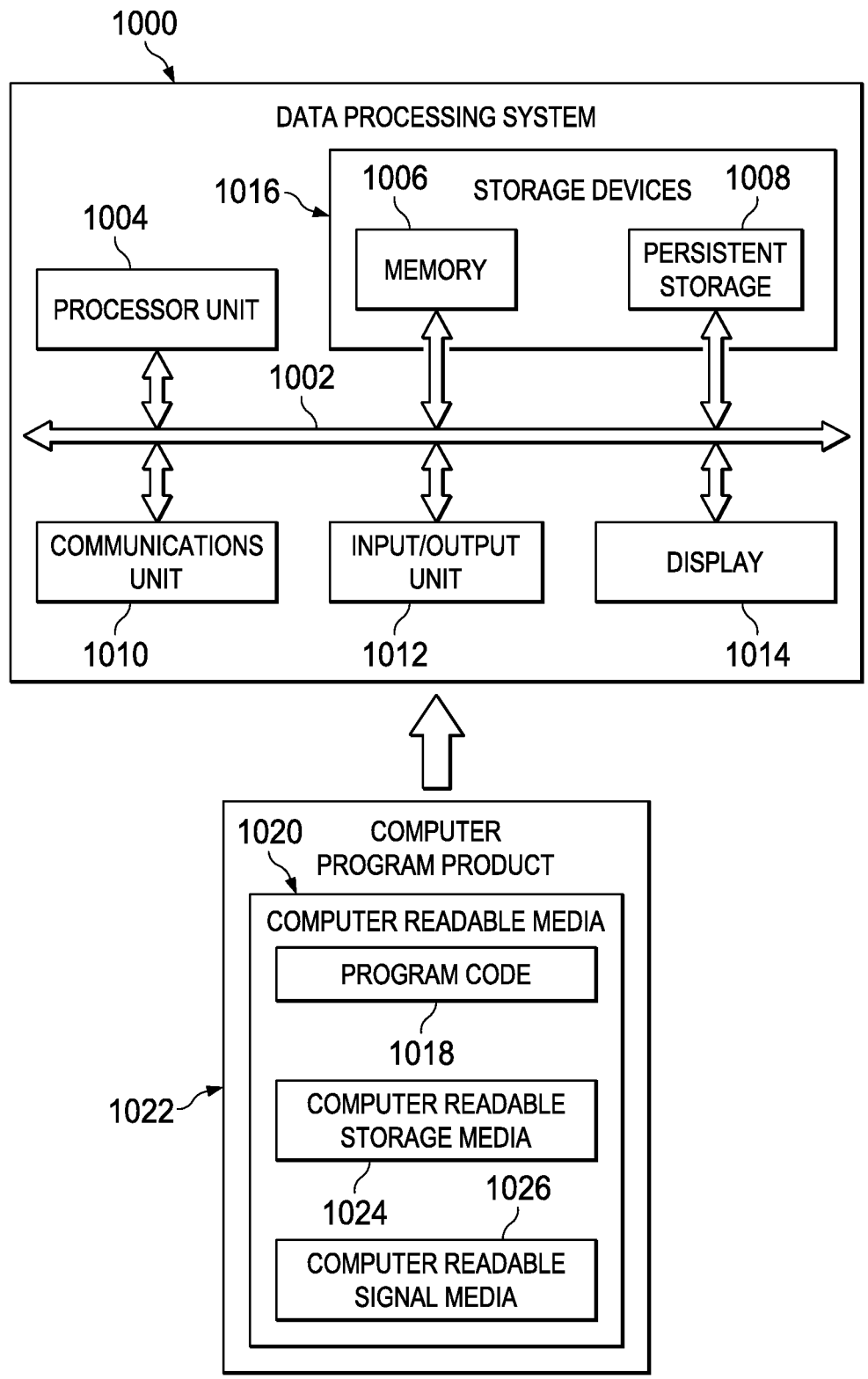
FIG. 10 is an illustration of a block diagram of a data processing system in accordance with an illustrative embodiment.

Turning now to FIG. 10, an illustration of a block diagram of a data processing system is depicted in accordance with an illustrative embodiment. Data processing system 1000 may be used to implement computer system 118, as shown in block form in FIG. 1. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 may take the form of a bus system.

Processor unit 1004 serves to execute instructions for software that may be loaded into memory 1006. Processor unit 1004 may be a number of processors, a multi-processor core, or some other type of processor, depending on the particular implementation.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer readable storage devices in these illustrative examples. Memory 1006, in these examples, may be, for example, a random access memory or any other suitable volatile or non-volatile storage device. Persistent storage 1008 may take various forms, depending on the particular implementation.

For example, persistent storage 1008 may contain one or more components or devices. For example, persistent storage 1008 may be a hard drive, a solid state hard drive, a flash memory, a rewritable optical disk, a rewritable magnetic tape, or some combination of the above. The media used by persistent storage 1008 also may be removable. For example, a removable hard drive may be used for persistent storage 1008.

Communications unit 1010, in these illustrative examples, provides for communications with other data processing systems or devices. In these illustrative examples, communications unit 1010 is a network interface card.

Input/output unit 1012 allows for input and output of data with other devices that may be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs may be located in storage devices 1016, which are in communication with processor unit 1004 through communications framework 1002. The processes of the different embodiments may be performed by processor unit 1004 using computer-implemented instructions, which may be located in a memory, such as memory 1006.

These instructions are referred to as program code, computer usable program code, or computer readable program code that may be read and executed by a processor in processor unit 1004. The program code in the different embodiments may be embodied on different physical or computer readable storage media, such as memory 1006 or persistent storage 1008.

Program code 1018 is located in a functional form on computer readable media 1020 that is selectively removable and may be loaded onto or transferred to data processing system 1000 for execution by processor unit 1004. Program code 1018 and computer readable media 1020 form computer program product 1022 in these illustrative examples. In one example, computer readable media 1020 may be computer readable storage media 1024 or computer readable signal media 1026. In these illustrative examples, computer readable storage media 1024 is a physical or tangible storage device used to store program code 1018 rather than a medium that propagates or transmits program code 1018.

Alternatively, program code 1018 may be transferred to data processing system 1000 using computer readable signal media 1026. Computer readable signal media 1026 may be, for example, a propagated data signal containing program code 1018. For example, computer readable signal media 1026 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1000 are not meant to provide architectural limitations to the manner in which different embodiments may be implemented. The different illustrative embodiments may be implemented in a data processing system including components in addition to or in place of those illustrated for data processing system 1000. Other components shown in FIG. 10 can be varied from the illustrative examples shown. The different embodiments may be implemented using any hardware device or system capable of running program code 1018.

Thus, the illustrative examples provide a method and apparatus for visualizing information. In one illustrative example, one or more technical solutions are present that overcome a technical problem with searching for information in databases or other sources. As a result, one or more technical solutions may provide a technical effect in which information is presented more efficiently for performing a visual analysis. Further, in the illustrative examples, the categories selected are dynamic. In other words, the categories and the information in the categories may change over time. If more current information or some other type information becomes more useful or desirable for a particular analysis, that category for the information in the category may be selected for use in the visualization displayed to an operator. Further, the categories of information also may change based on operators accessing information.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method comprising:
visualizing information by a computer:
  displaying a current graphical element centrally in a graphical user interface on a display system, wherein:
    the current graphical element represents a current category for the information in an information system; and
    the information is different than the current category;
  displaying a group of related graphical elements around the current graphical element in the graphical user interface, wherein:
    the group of related graphical elements corresponds to a group of related categories for the information in the information system and includes at least a portion of the information for the group of related categories;
    the group of related categories is different than the information; and
    each element of the group of related graphical elements is graphically connected only to the current graphical element;
  responsive to a current user selecting an element of the group of related graphical elements, displaying a selected related graphical element centrally in place of the current graphical element, wherein the selected related graphical element becomes the current graphical element;
  after user selection of the element of the group of related graphical elements, dynamically identifying, using a statistical-based process, a group of categories that is related to a selected category corresponding to the selected related graphical element, wherein:
    the group of categories becomes the group of related categories;
    each category of the group of categories is graphically connected to the current graphical element; and
    the statistical-based process identifies the group of categories based on tracked usage of categories in related categories, relative weighting assigned to the selected category based on the current category, an identity of the current user, a search history of the current user, and a search history of other users; and
  dynamically changing, in response to dynamic identification of the group of categories, a display of the group of related graphical elements;
    corresponding to the group of related categories identified as being related to the selected category; and
    including the portion of the information for the group of related categories related to the selected category; and
  enabling visual analysis of the information.

2. The method of claim 1 further comprising the computer:
identifying the group of related categories that is related to the current category.

3. The method of claim 1 further comprising the computer:
repeating the steps of displaying the selected related graphical element from the group of related graphical elements centrally in place of the current graphical element responsive to selection of the selected related graphical element, wherein the selected related graphical element becomes the current graphical element; identifying the group of categories that is related to the selected category corresponding to the selected related graphical element, wherein the group of categories becomes the group of related categories; and changing the display of the group of related graphical elements to correspond to the group of related categories identified as being related to the selected category and include the portion of the information for the group of related categories related to the selected category each time the selected related graphical element is selected from the group of related graphical elements displayed in the graphical user interface.

4. The method of claim 1 further comprising the computer:
displaying additional information for a particular category in the group of related categories responsive to a graphical element corresponding to the particular category being selected by a user input requesting the additional information.

5. The method of claim 1 further comprising the computer:
selecting additional information for a particular category in the group of related categories based on statistics of what types of the information are useful.

6. The method of claim 1, wherein at least one of the group of related categories for the information in the information system or the portion of the information for the group of related categories is different for different users of the graphical user interface.

7. The method of claim 1 further comprising the computer:
displaying a control in the current graphical element, wherein the control is configured to receive a user input selecting a new current category;
identifying a new group of related graphical elements that is related to the new current category; and
displaying a new current graphical element in place of the current graphical element and the new group of related graphical elements around the new current graphical element in the graphical user interface, wherein the new group of related graphical elements corresponds to a new group of related categories for the information in the information system and includes the portion of the information for the new group of related categories.

8. The method of claim 1, wherein the information has a form selected from one at least one of a chart, a spreadsheet, a key performance indicator, a table, a report, a pie chart, a line graph, a video, or a website.

9. The method of claim 1, wherein the information is selected from at least one of demographics, diversity information, product information, jobs data, research, product analysis, business plans, financials, retention information, or human resources information.

10. The method of claim 1 further comprising the computer:
performing an action for an organization based on the visual analysis, wherein the action is selected from one of making a hiring decision, selecting people for a team, performing reviews, making compensation changes, creating a marketing plan, and revising a company policy.

11. A computer system comprising:
a display system; and
an information manager in communication with the display system, wherein the information manager:
displays a current graphical element centrally in a graphical user interface on the display system, wherein the current graphical element represents a current category for information in an information system;
displays a group of related graphical elements around the current graphical element in the graphical user interface, wherein:
the group of related graphical elements corresponds to a group of related categories for the information in the information system and includes a portion of the information for the group of related categories; and
each element of the group of related graphical elements is connected only to the current graphical element;
dynamically displays a selected related graphical element from the group of related graphical elements centrally in place of the current graphical element responsive to selection of the selected related graphical element, wherein the selected related graphical element becomes the current graphical element;
dynamically identifies a group of categories that is related to a selected category corresponding to the selected related graphical element, wherein the group of categories becomes the group of related categories, and wherein a statistical-based process identifies the group of categories based on tracked usage of categories in related categories, relative weighting assigned to the selected category based on the current category, an identity of a current user, a search history of the current user, and a search history of other users; and
dynamically changes a display of the group of related graphical elements to correspond to the group of related categories identified as being related to the selected category and include the portion of the information for the group of related categories related to the selected category, enabling a visual analysis of the information.

12. The computer system of claim 11, wherein the information manager identifies the group of related categories that is related to the current category.

13. The computer system of claim 11, wherein the information manager repeats the steps of displaying the selected related graphical element from the group of related graphical elements centrally in place of the current graphical element responsive to selection of the selected related graphical element, wherein the selected related graphical element becomes the current graphical element; identifying the group of categories that is related to the selected category corresponding to the selected related graphical element, wherein the group of categories becomes the group of related categories; and changing the display of the group of related graphical elements to correspond to the group of related categories identified as being related to the selected category and include the portion of the information for the group of related categories related to the selected category each time the selected related graphical element is selected from the group of related graphical elements displayed in the graphical user interface.

14. The computer system of claim 11, wherein the information manager displays additional information for a particular category in the group of related categories responsive to selection of a graphical element corresponding to the particular category by a user input requesting the additional information.

15. The computer system of claim 11, wherein the information manager selects additional information for a particular category in the group of related categories based on statistics of what types of the information are useful.

16. The computer system of claim 11, wherein at least one of the group of related categories for the information in the information system or the portion of the information for the group of related categories is different for different users of the graphical user interface.

17. The computer system of claim 11, wherein the information manager displays a control in the current graphical element, wherein the control is configured to receive a user input selecting a new current category; identifies a new group of related graphical elements that is related to the new current category; and displays a new current graphical element in place of the current graphical element and the new group of related graphical elements around the new current graphical element in the graphical user interface, wherein the new group of related graphical elements corresponds to a new group of related categories for the information in the information system and includes the portion of the information for the new group of related categories.

18. The computer system of claim 11, wherein the information has a form selected from one at least one of a chart, a spreadsheet, a key performance indicator, a table, a report, a pie chart, a line graph, a video, or a website.

19. The computer system of claim 11, wherein the information is selected from at least one of demographics, diversity information, product information, jobs data, research, product analysis, business plans, financials, retention information, or human resources information.

20. A computer program product comprising:
a non-transitory, computer readable storage medium including instructions for visualizing information, wherein the instructions comprise:
first program code for displaying a current graphical element centrally in a graphical user interface on a display system, wherein a central element represents a current category for the information in an information system;
second program code for displaying a group of related graphical elements around the current graphical element in the graphical user interface, wherein the group of related graphical elements corresponds to a group of related categories for the information in the information system and includes a portion of the information for the group of related categories;
third program code for dynamically displaying a selected related graphical element from the group of related graphical elements centrally in place of the current graphical element responsive to selection of the selected related graphical element, wherein the selected related graphical element becomes the current graphical element;
fourth program code for, responsive to selection of the selected related graphical element, dynamically identifying a group of categories that is related to a selected category corresponding to the selected related graphical element, wherein:
the group of categories becomes the group of related categories;
each category of the group of categories is connected only to the current graphical element; and
a statistical-based process identifies the group of categories based on tracked usage of categories in related categories, relative weighting assigned to the selected category based on the current category, an identity of a current user, a search history of the current user, and a search history of other users; and
fifth program code for dynamically changing a display of the group of related graphical elements to correspond to the group of related categories identified as being related to the selected category and include the portion of the information for the group of related categories.

\* \* \* \* \*

UNITED STATES PATENT AND TRADEMARK OFFICE
CERTIFICATE OF CORRECTION

| | | |
|---|---|---|
| PATENT NO. | : 11,449,513 B2 | Page 1 of 1 |
| APPLICATION NO. | : 15/059743 | |
| DATED | : September 20, 2022 | |
| INVENTOR(S) | : Bianchini et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 761 days.

Signed and Sealed this
Thirty-first Day of December, 2024

Derrick Brent
*Acting Director of the United States Patent and Trademark Office*